March 20, 1956 A. W. HOLT 2,739,236
DYNAMIC BIASING FOR BINARY PULSE AMPLIFIERS
Filed April 7, 1952 2 Sheets-Sheet 1

INVENTOR.
ARTHUR W. HOLT
BY
Howard L. Rose
AGENT

March 20, 1956 A. W. HOLT 2,739,236

DYNAMIC BIASING FOR BINARY PULSE AMPLIFIERS

Filed April 7, 1952 2 Sheets-Sheet 2

INVENTOR.
ARTHUR W. HOLT
BY
Howard L. Rose
AGENT

United States Patent Office 2,739,236

Patented Mar. 20, 1956

2,739,236

DYNAMIC BIASING FOR BINARY PULSE AMPLIFIERS

Arthur W. Holt, Mount Rainier, Md., assignor to the United States of America as represented by the Secretary of Commerce Application April 7, 1952, Serial No. 281,022

6 Claims. (Cl. 250—27)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

This invention relates to the improvement of binary pulse amplifier and gating systems and in particular to improvements in the reliability of Williams type memory systems.

The modern electronic computer, which is in its essence a very high-speed machine, has been handicapped in the past by the inability of its memory organ to match the speeds attained by the arithmetic units of the machine. One promising solution to this difficulty is the Williams system of cathode-ray-tube storage, by means of which speedy access may be had to more than a thousand binary digits stored on the face of one cathode-ray tube. The practical speeds attained by this system have so impressed computer designers that most of the highest speed computers being built today are equipped with Williams memory.

Storage by the Williams method is accomplished inside an oscilloscope type of high-vacuum cathode-ray tube, utilizing potential differences of a volt or so which occur at separate points on the insulating phosphor surfaces. In order to keep these minute charges from leaking off, it is necessary to "regenerate " each one of the points at a rate upwards of 100 times a second, the regeneration being sequential. Pickup of the information signals, whose amplitudes are less than a millivolt, is by capacitive coupling from the phosphor surface to a conducting medium fastened on the outside face of the cathode ray tube. By pointing its electron beam, the system may select any digit for machine action or regeneration, and it is a direct result of the extreme mobility of this electron beam that the Williams system offers such inherently quick access.

The regeneration of the information on the face of the tube in the Williams system is accomplished by external means in the following manner: If a certain nonstable condition of the storage medium produces, when interrogated, a characteristic output signal, the medium may be re-excited to that same condition and thus be perpetuated in a condition which is not inherently stable.

The electron gun may be aimed at any one of a number of positions on the phosphor; if it is desired to write a zero in this spot, the beam is turned on and writes a characteristic potential on the phosphor. The beam need be on for only one-half microsecond or less. To write a one, the same procedure is followed, except that instead of turning the beam off after one-half microsecond, the beam is held on for about 3 microseconds more while it is deflected a distance of about one spot diameter to the side, thereby producing a dash instead of a dot. To read the information at some later time, the same procedure is followed as in writing a zero. When the beam is turned on for reading, a negative signal appears on the pick-up screen if the information was a zero, but if the information was a one, the output signal is positive. The act of reading is the same as the act of writing, so in the event that a positive signal is obtained, it is necessary to immediately rewrite the one condition in order to maintain continuous storage of information. Since the system is not inherently stable, it is necessary to regenerate (read and rewrite) each address at frequent intervals, independent of any access desired by the computer.

Difficulty is often encountered in this system because of what is known as weak dots, that is, weak zero signals. This difficulty arises particularly when the maximum read-around ratio is approached; that is, when the information stored in the areas around the dot currently being read have been read a large number of times before the system has had a chance to regenerate the dot now under investigation. The result of this is that a large part of the charge originally stored in the dot has leaked off and the dot becomes weak. When this happens the dot may give off a positive signal rather than a negative one and the system will therefore detect a dash (a one) instead of a dot.

One method that has been proposed to overcome this difficulty is to set the gating level of the amplifier, which receives the output from the cathode-ray tube, more positive by several volts than the no-signal level, which is where the gating level is usually maintained. In this way the system may be able to discriminate between the very large positive signal put out by a dash and a small positive signal which is really part of a weak dot signal. The weakness of this method of biasing the gating level of the amplifier is that the amplifier gain must be held within very close limits. For example, assume that the designer has the limitation that his weakest dash signal is only +14 volts; by placing his gating level at +12 volts, he has reasonable assurance that his weakest dash will always gate, and that all dot signals less than +10 volts will not gate. If the amplifier gain should increase by 20 per cent, however, the weak dot signals will now be above gating level and cause errors; conversely, if the amplifier gain should decrease by 20 per cent, the weakest dash signals may not gate correctly. Thus it can be seen that if a biased gating level is used in the presence of serious disturbance, such as is the case in Williams storage, a stabilized gain amplifier must be used. This is expensive and adds greatly to the bulk of the machine.

An object of the invention is to provide a simple and reliable pulse amplifier system.

Another object of the invention is to improve the reliability of the gating of pulses in binary amplifier systems.

Another object of the invention is to provide simple means for improving the reliability of Williams memory systems for use with binary digital computers.

Still another object of the invention is to improve the reliability of pulse amplifier systems by providing dynamic biasing for the amplifiers.

Another object of the invention is to provide dynamic biasing for pulse amplifier systems without changing the gating level of the amplifiers.

Another object of the invention is to eliminate errors in the output circuitry of Williams memory systems which result from the reading of weak dots on the face of the storage tube.

In accordance with the present invention a negative pulse whose timing may be closely controlled, whose width is about 0.5 microsecond, and whose amplitude may be of any convenient value, is distributed to the cathode-ray tube and connected to the pick-up plate by capacitive coupling. The amount of capacitive coupling may be varied at each tube and is determined by the amount of the bias desired.

By this method the dynamic biasing pulse is added to the signal produced on the pick-up plate. The amplitude of the dish signal is reduced but still remains positive with respect to the gating level of the amplifier. On the other hand the weak dot pulse is driven negative with respect to the gating level and all chance of misreading the dot signals is eliminated. In this way the amplifier gain may vary over a wide range, since the gain will in no way affect the algebraic sign of the input; that is, regardless of the gain, a positive signal will still be positive and a negative signal will still be negative.

By computer we do not restrict ourselves to a device for performing arithmetical manipulations on coded numbers, but we include in the term all devices for correlating any coded information.

Other uses and advantages of the invention will become apparent upon reference to the specification and drawings.

Figure 1:
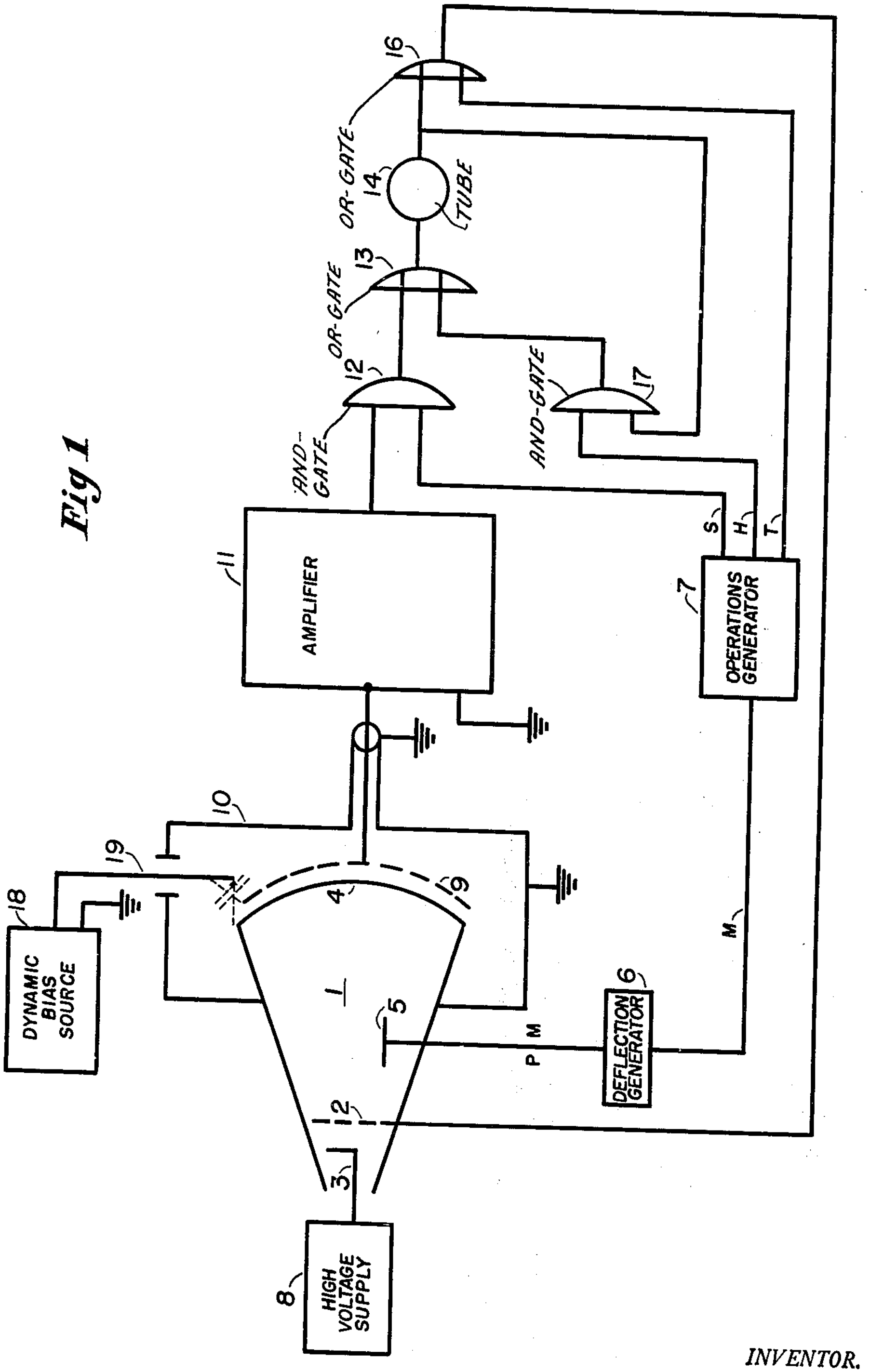
Figure 1 is a logical block diagram of the Williams memory.

Referring to Figure 1, the storage or cathode-ray tube 1 of the Williams memory system has a grid 2, a cathode 3, and a phosphor surface 4. The horizontal and vertical deflection plates, which are represented by the single plate 5, are supplied from the deflection generator 6. The voltage for the cathode of the tube 1 is supplied by the negative high-voltage source 8. A pick-up plate 9 made of ordinary wire screening is cemented to the front of the tube so that it can capacitively pick up the signals written on the face of the tube when these signals are interrogated by the electron beam. The entire end portion of the tube is enclosed in a grounded shield 10. A shielded lead carries the output from the tube to the amplifier 11. The output of the amplifier is fed to one input of the and-gate 12, the other input being connected to receive strobe pulses S. An and-gate is an electronic circuit with at least two inputs which will pass a signal only when a pulse appears on all of the inputs simultaneously. A detailed explanation of these circuits can be found in application Ser. No. 193,696, filed November 2, 1950. The output of the and-gate 12 is connected to one input of the or-gate 13, and the output of the or-gate is fed to the tube 14. An or-gate is a circuit with at least one input which will pass a signal that appears on any of the input leads regardless of whether or not a signal appears on the other inputs. A detailed explanation of these circuits can also be found in application Ser. No. 193,696, filed November 2, 1950. The output of the tube goes to the or-gate 16, which also has a timing pulse input T. The output of tube 14 is also supplied to the and-gate 17, which has a second input connected to receive hold-pulses H. The output of gate 17 is fed to the other input of the or-gate 13.

Figure 2:
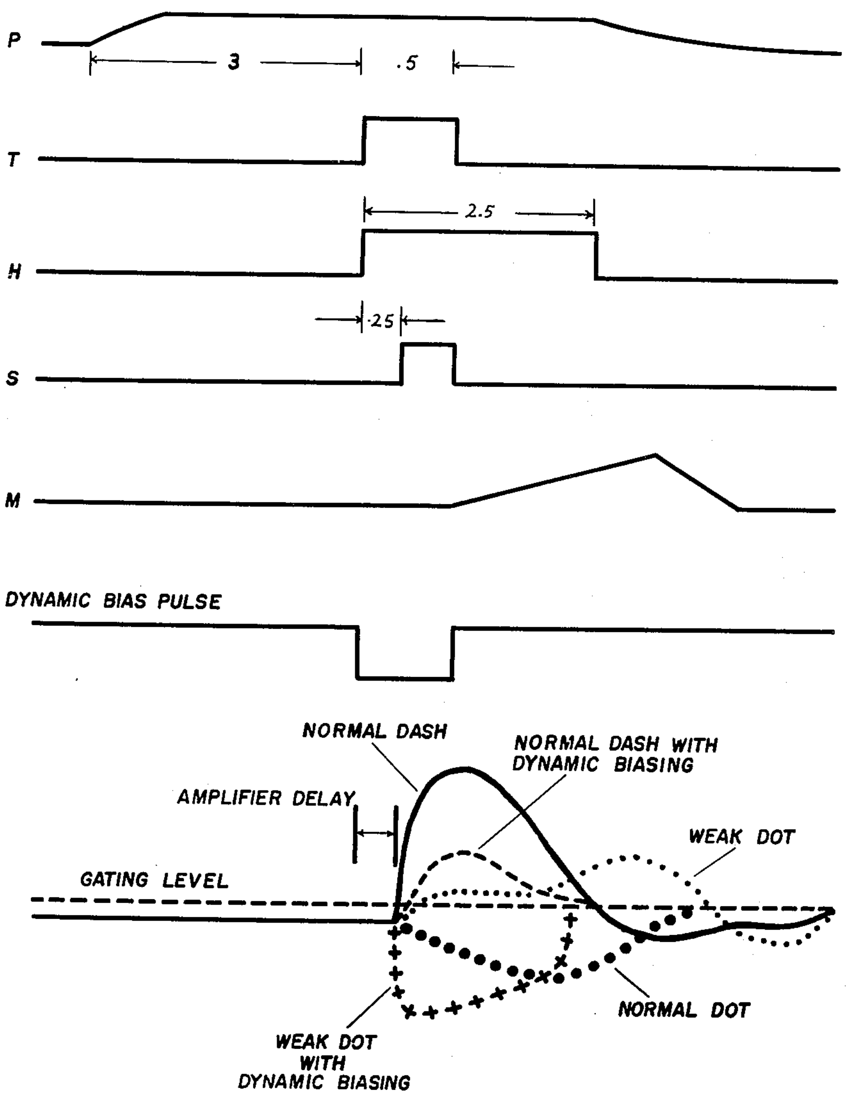
Figure 2 is a graph showing the time relation and amplitude of the control pulses for the tube.

An operations generator 7 supplies the twitch pulse M to the deflection generator 6, the strobe pulse S to the and-gate 12, the hold-pulse H to the and-gate 17, and the timing pulse T to the or-gate 16. The functioning of the operations generator is well known in the computer art, this generator being nothing more than a source of precisely determined pulses having a definite time relationship. Therefore the discussion of this component will be limited to a description of the timing relationships between the various pulses supplied by this unit. These pulses are shown in Figure 2 and have the following time relations. For the purposes of this discussion the start of the plate pulse P, which is supplied to the plates 5 by the deflection generator 6, will be considered as zero time. Three microseconds after the start of the plate pulse the T-pulse is applied to the or-gate 16 and lasts for 0.5 microsecond. The hold-pulse H also supplied by the generator 7 is applied to the and-gate 17 at the same time as the T-pulse is applied to or-gate 16. The H-pulse lasts for 2.5 microseconds, or 2 microseconds longer than the T-pulse. The strobe pulse S is applied to the and-gate 13, 3.25 microseconds after the start of the plate pulse or 0.25 microsecond after the start of the T and H pulses. This pulse lasts 0.25 microsecond and therefore terminates at the same time as the T pulse. The twitch pulse M is applied to the plates 5 at the same time that the strobe and timing pulses are turned off; that is, 3.5 microseconds after the start of the plate pulse.

The twitch pulse M is a deflection pulse that is applied to the horizontal plates of the cathode-ray tube 1. The voltage of this pulse is sufficient to move the electron beam about one spot diameter to the side of the original spot, and this double spot is the means used for representing a dash.

The strobe and hold pulses are timing pulses which are supplied to the and-gates 12 and 17, respectively, and they determine the precise times at which these gates will pass a signal. As stated above, an and-gate is an electronic circuit having two or more inputs which requires that a pulse appear on all the inputs simultaneously before the gate will pass a signal. Each of the and-gates 12 and 17 has 2 inputs in this circuit, the timing pulses and the information pulses. The information pulses may appear at the inputs over a longer period of time than the circuit requires their use and therefore the strobe and hold pulses determine the exact times at which the gates will pass the information on to the rest of the circuit.

The dynamic biasing is supplied from the pulse source 18 over lead 19. The lead 19 is inserted through, but insulated from, the shield 10. The lead 19 is held close to the screen 9 and thereby the pulses from the source 18 are capacitively coupled to the screen. The amount of coupling is varied by simply moving the lead nearer to or farther from the screen. The pulse supplied by the source 18 is shown in Figure 2 as the dynamic biasing pulse. This pulse coincides with pulse T, bracketing pulse S.

The operation of the circuit will be explained with reference to Figures 1 and 2. The operation of the dynamic biasing circuit will not be discussed until later, since its usefulness will not become apparent until the operation of the rest of the circuit is understood. During the period the tube is not operating, the electron beam is prevented from reaching the phosphor surface 4 by the proper biasing of the grid 2. Prior to turning on the electron beam the plate wave form is applied to the plate 5. This wave form, which determines the beam position, has a precisely determined amplitude corresponding to the location of the information to be examined. Three microseconds after the plate pulse is applied, the clock pulse T is supplied from the operation generator 7 to the or-gate 16. Since only one input is required to operate an or-gate, the gate 16 will pass the T-pulse. The output of the or-gate 16 is applied to the grid 2 and turns on the beam. If a dash is detected on the phosphor surface, the output from the screen 9 will be positive and will have the shape of the normal dash pulse as shown in Figure 2. The dot and dash output signals are shown as they exist at the output of the amplifier 11. In this discussion the amplifier is assumed to be linear and therefore the waves at the amplifier output are of the same shape as those picked up by the plate 9. The waves are shown as they exist at the amplifier output rather than at the pick-up plate 9, so that the strobe pulse and the dot and dash signals are shown in their true time relationship with respect to the input to the and-gate 12, since it is the coincidence of the strobe pulse and the amplifier output that operates the and-gate. If these signals were shown at the input to the amplifier instead of the output, the time relationship referred to above would not be apparent, since it is the amplifier delay, indicated in Figure 2, that makes the timing correct. In actual practice the amplifiers are not linear as assumed above but are high-gain amplifiers with a nonlinear output that cuts off the top of the signals giving flat-topped waves. This is done to prevent overloading of the circuit components in the and-gate.

Since the dash pulse referred to above is above the gating level of the amplifier 11, the amplifier output will be positive. The gating level of the amplifier determines whether a particular input voltage pulse will produce a positive or a negative output voltage pulse. If a pulse is positive with respect to the gating level the output will be positive and if the input is negative with respect to the gating level the output will be negative. In this circuit the gating level is slightly positive as can be seen in Figure 2. The strobe pulse S is turned on one-half microsecond after the beginning of the timing pulse T and lasts for 0.25 microsecond. The coincidence of the positive output from the amplifier and the stroke pulse will operate the and-gate 12 so that a positive pulse will be applied to the or-gate 13. The output of this gate is applied to the tube 14 and turns it on. The output of the tube is applied to the inputs of the or-gate 16 and the and-gate 17. The input to the or-gate appears at the output of this gate and is applied to the grid 2. However, since the output from the or-gate 16 lasts only as long as the strobe pulse or the T-pulse, both of which terminate at the same time, means must be provided to hold on the beam of the cathode-ray tube for another 3 microseconds after the strobe pulse has terminated, during which time the twitch pulse M is applied to the plate 5. This is necessary since a dash was read on the face of the tube and therefore a dash must be rewritten. As explained before, in order that a dash may be written the electron beam must be deflected about one spot diameter to the side of the original spot. The twitch pulse M is the voltage supplied to the deflection plates for the purpose of deflecting the electron beam, and therefore the beam must remain on during the pulse if a dash is to be put on the face of the tube. The means for holding on the electron beam during the twitch pulse is the and-gate 17. This gate is turned on by the coincidence of the output from tube 14 and the hold-pulse H. The hold-pulse is applied to the gate 17 at the same time as the T-pulse is applied to the gate 16 and lasts for 2.5 microseconds. Therefore the hold pulse lasts for 2 microseconds longer than the strobe pulse, and is on for 2 microseconds of the twitch pulse period. The output from the and-gate is applied to the or-gate 13 and is handled in the same way as the output from the and-gate 12. The output from tube 14 continues to feed the input to and-gate 17, and as long as the hold-pulse is on, this part of the system is regenerative. Therefore as long as the hold-pulse is turned on, the grid 2 will be biased positively and the electron beam will continue to write.

If a dot is read initially, the output from the screen 9 will be negative, as shown by the normal dot of Figure 2, and will be below the gating level of the amplifier 11. The output from the amplifier will be negative, and the and-gate 12 will not be turned on, since only the strobe pulse input will be positive. Therefore the electron beam will remain on only during the duration of the T-pulse and will be turned off before the twitch pulse M is applied to the horizontal deflection plates 5.

The difficulty with the system as just described is that under certain conditions, the dot on the face of the tube becomes very weak and as a result gives a poor output signal, as shown by the "weak dot pulse" of Figure 2. As can be seen from the curves of Figure 2, the output from the weak dot becomes more positive than the gating level of the amplifier during the period that the strobe pulse is on. Consequently, a positive output from the amplifier and the strobe pulse appear at the same time on the inputs to the end-gate 12, and the gate is energized. The system will now operate as if a dash had been read on the face of the tube 1, and a dash will be written in place of the dot that was originally detected. As was pointed out earlier, prior attempts to overcome this difficulty have taken the form of changing the gating level of the amplifier and thereby making it necessary to use a gain-stabilized amplifier for each cathode-ray tube. The resulting increased complexity of the circuitry of the computer has made it undesirable to employ this system.

The present invention overcomes the difficulty encountered when weak dots are read on the face of the cathode-ray tube by dynamically biasing the amplifiers for a period greater than the duration of the strobe pulse. The dynamic biasing is provided in the following manner. The rectangular biasing pulses are generated in the bias source 18 and are carried to the pick-up plate over the lead 19. The lead is inserted in a hole in the shield 10 and is insulated therefrom. The lead is held a short distance from the screen 9 and the bias signal is capacitively coupled to the screen. The amount of coupling is varied by simply moving the wire nearer to or farther from the screen. This bias signal has a duration of approximately 0.5 microsecond, starting before and ending after the period of the strobe pulse. The amplitude of the signal may be of any convenient value depending upon the circuit parameters.

The dynamic biasing eliminates the difficulty usually encountered when reading weak dots in the following manner: The gating level of the amplifier remains the same as in the original system. Therefore the amplifier need only detect whether or not there is a positive signal on the input. If the input is positive, the amplifier output will be positive. If the input is negative the output will be negative. Therefore the gain of the amplifier is immaterial and can vary over a great range. The dynamic biasing signal applied to the screen 9 is added to the voltages obtained from the phosphor surface and drives down the potential of the pick-up plate with respect to the gating level of the amplifier. The dash signal from the screen now has the shape and amplitude as shown by the pulse marked "normal dash with dynamic biasing." This pulse is still positive with respect to the gating level of the amplifier and therefore the amplifier output will be positive. On the other hand the weak dot signal has been driven negative, as shown by the pulse marked "weak dot with dynamic biasing," and is well below the gating level of the amplifier. There is no chance for the signal to go positive during the strobe pulse.

From the foregoing it is apparent that a far more reliable Williams memory system has been achieved with the addition of only one piece of equipment, the dynamic biasing source. It should be noted that the precise duration of the several pulses supplied to the system are not critical and that the values assumed in the discussion are only exemplary.

The invention has been described as being employed in a Williams memory system. It is apparent, however, that the invention could be used with most binary memory systems, or more generally in any system where there is a necessity for amplifying binary pulses which are to be handled or transferred.

I claim:

1. In an electrostatic memory system, a cathode ray tube, means for storing quantized charges on the phosphor face of said cathode-ray tube, a pick-up plate placed in juxtaposition with said phosphor face, means for obtaining signal voltage pulses from the stored charges on said pick-up plate as an indication of the condition of storage at predetermined discrete locations on the face of the cathode-ray tube, said signal voltage pulses being of two different voltage levels representing two predetermined conditions that are to be distinguished from each other, an amplifier whose input is connected to said pick-up plate, the gating level of said samplifier being positive with respect to the normal signal voltage pulses representing a first of said conditions and being negative with respect to the normal signal voltage pulses representing a second of said conditions, a pulse source for generating biasing voltage pulses of a fixed polarity which is negative with respect to said amplifier gating level and of a fixed amplitude, the magnitude of which is such that the sum of said normal signal voltage representing a first of said conditions and said biasing pulse is always negative with respect to said gating level and the sum of said normal signal voltage pulse representing a second of said conditions and said biasing pulse is always positive with respect to said gating level and a circuit for adding said biasing voltage pulses to said signal voltage pulses.

2. In an electrostatic memory system, a cathode ray tube, means for storing quantized charges on the phosphor face of said cathode ray tube, said charges representing conditions to be stored, the first of said conditions being a binary zero and the second of said conditions being a binary one, a pick-up plate placed in juxtaposition with said phosphor face, means for obtaining signal voltage pulses from the stored charges on said pick-up plate as an indication of the condition of storage at predetermined discrete locations on the face of the cathode-ray tube, said signal voltage pulses being of two different levels, depending upon the information stored at the particular point being investigated, an amplifier whose input is connected to said pick-up plate, the gating level of said amplifier being set at a value which is positive with respect to one normal voltage level and negative with respect to the other normal voltage level, a pulse source for generating biasing voltage pulses of a fixed polarity which is negative with respect to said amplifier gating level and of a fixed amplitude, the magnitude of which is such that the sum of said first normal voltage level and said biasing pulse is always negative with respect to said gating level and the sum of said other normal voltage level and said biasing pulse is always positive with respect to said biasing pulse, and a circuit for adding said biasing voltage pulses to said signal voltage pulses.

3. The invention according to claim 2 in which the biasing voltage pulse source is capacitively coupled to the pick-up plate.

4. In a binary system for distinguishing between two conditions which are normally represented by positive and negative pulses, respectively, and in which the negative pulses occasionally become positive by a small amount, an amplifier having a zero voltage gating level and means for maintaining said negative pulses negative with respect to said gating level without affecting the algebraic sign of said positive pulses with respect to said gating level, said means including a source of negative biasing pulses having a fixed amplitude of a magnitude such that the sum of said first-mentioned positive pulse and said biasing pulse is always positive with respect to said amplifier gating level and the sum of either said first-mentioned negative pulse or said second-mentioned small positive pulse and said biasing pulse is always negative with respect to said amplifier gating level and means for adding said biasing pulses to all of said positive and negative pulses.

5. In a cathode-ray-tube memory system first means for producing voltage pulses, the amplitude and algebraic sign of each pulse being indicative of a binary digit, said first means occasionally producing a voltage pulse representing one of said binary digits that has an algebraic sign opposite to that which is normally indicative of one of said binary digits, an amplifier having its input connected to receive said voltage pulses, the gating level of said amplifier being positive with respect to the voltage pulses representing one of said binary digits and being negative with respect to the voltage pulses representing the second of said binary digits and means for maintaining the voltage pulses representing one of said binary digits negative with respect to said gating level without affecting the algebraic sign of the voltage pulses representing the other of said binary digits, said last-mentioned means including a source of precisely determined negative biasing voltage pulses having a fixed amplitude of a magnitude such that the sum of said voltage pulse representing said one of said binary digits and said negative biasing voltage pulse is always negative with respect to said amplifier gating level, and means for adding said biasing voltage pulses to said voltage pulses.

6. In a cathode-ray-tube memory system first means for storing discrete charges at predetermined memory locations, each charge representing a binary digit, second means for producing voltage pulses from said charges, the amplitude and algebraic sign of each pulse normally being indicative of the binary digit represented by the charge from which said pulse is derived, said second means occasionally producing a voltage pulse representing one of said binary digits that has an algebraic sign opposite to that which is normally indicative of said binary digit, the magnitude of said pulse being less than the amplitude of the voltage pulse representing the second of said binary digits, an amplifier having its input connected to receive said voltage pulses, the gating level of said amplifier being positive with respect to the voltage pulses representing one of said binary digits and being negative with respect to the voltage pulses representing the second of said binary digits and means for maintaining the voltage pulses representing said one of said binary digits negative with respect to said gating level without affecting the algebraic sign of the voltage pulses representing the other of said binary digits, said last-mentioned means including a source of precisely determined negative biasing voltage pulses having a fixed amplitude of a magnitude such that the sum of said voltage pulse representing said one of said binary digits and said negative biasing voltage pulse is always negative with respect to said amplifier gating level, and means for adding said biasing voltage pulses to said voltage pulses.

References Cited in the file of this patent

UNITED STATES PATENTS

| | | |
|---|---|---|
| 1,929,067 | Hund | Oct. 3, 1933 |
| 2,213,070 | Farnsworth | Aug. 27, 1940 |
| 2,241,809 | DeForest | May 13, 1941 |
| 2,468,058 | Grieg | Apr. 26, 1949 |
| 2,525,077 | Morton | Oct. 10, 1950 |
| 2,548,789 | Hergenrother | Apr. 10, 1951 |
| 2,598,612 | Shonnard | May 27, 1952 |
| 2,642,550 | Williams | June 16, 1953 |

OTHER REFERENCES

Eckert et al.: Dynamically Regenerated Electrostatic Memory System, Proc. of IRE, vol. 38, No. 5, pp. 498–510, May 1950.